United States Patent [19]
Tokuda

[11] Patent Number: 5,001,513
[45] Date of Patent: Mar. 19, 1991

[54] REFLECT TYPE PHOTOGRAPHIC PRINTER

[75] Inventor: Kanji Tokuda, Kanagawa, Japan

[73] Assignee: Fuji Photo Film Co., Ltd., Kanagawa, Japan

[21] Appl. No.: 470,499

[22] Filed: Jan. 26, 1990

[30] Foreign Application Priority Data

Feb. 6, 1989 [JP] Japan ................................. 1-27288

[51] Int. Cl.⁵ ...................... G03B 27/52; G03B 27/70
[52] U.S. Cl. ...................................... 355/43; 355/66; 355/71
[58] Field of Search ..................... 355/43, 45, 54, 71, 355/51, 66; 350/286

[56] References Cited
U.S. PATENT DOCUMENTS
2,940,358  6/1960  Rosenthal .......................... 355/66

Primary Examiner—L. T. Hix
Assistant Examiner—D. Rutledge
Attorney, Agent, or Firm—Sughrue, Mion, Zinn, Macpeak & Seas

[57] ABSTRACT

A reflect type photographic printer having a flat plate mirror and a roof type mirror which are set selectively in an L-shaped printing optical path. If photographic film is loaded in the film carrier with its photosensitive emulsion layer directed upwardly, the roof type mirror is set within the printing optical path; if the film is loaded with the emulsion layer directed downwardly, the flat plate mirror is set within the printing optical path.

8 Claims, 4 Drawing Sheets

REFLECT TYPE PHOTOGRAPHIC PRINTER

BACKGROUND OF THE INVENTION

The present invention relates to a reflection type photographic printer, and more particularly to a reflection type photographic printer which is capable of printing an image frame of a photographic film without reloading it even if the film is incorrectly loaded upside down.

Conventional photographic printers use primarily a linear printing optical path or an L-shaped printing optical path. FIG. 10 shows an example of a photographic printer having a linear printing optical path. A photographic film, e.g., a negative film, set on a film carrier 7, is disposed facing a photosensitive member, e.g., a color paper 4. A printing lens 2 is interposed therebetween so that an image frame recorded in the negative film 1 is printed on the color film 4.

A reflection type photographic printer is shown in FIG. 11. A mirror 6, slanted at a 45° angle, is disposed between a taking lens 5 and a color paper 4, the mirror 6 forming an L-shaped printing optical path 8.

The negative film 1 is set on the film carrier 7 of the photographic printer of FIG. 10, with the film's front surface, i.e., its photosensitive emulsion layer, facing toward the color paper 4. In contrast, with the photographic printer of FIG. 11, the negative film 1 is set on the film carrier 7 while being turned upside down, i.e., with the photosensitive emulsion layer facing a light source 9, because an image projected upon the color paper is reversed between the right and left sides.

At a laboratory using the two types of photographic printers it becomes necessary to change the way a negative film is set on the film carrier 7 in accordance with the type of a printer. As a result, an operator could set the film incorrectly. At a laboratory using only one of the two types of photographic printers, such incorrect setting of a photographic film also may occur. When such incorrect film setting occurs, it is necessary to reload the film correctly, thereby lowering the efficiency of photographic film printing. If printing continues while a film is set incorrectly, a mirror image (with the right and left sides reversed) is recorded on a color paper. The recorded image should be discarded, resulting in economic loss.

SUMMARY OF THE INVENTION

The present invention is intended to solve the above problems by providing a reflection type photographic printer capable of printing a correct image, free from image reversal of the right and left sides of a photographic film, without reloading, even if the film has been set incorrectly.

In order to achieve the foregoing and other objects, the inventive reflection type photographic printer includes a flat plate type reflector device which reflects an image of a photographic film onto a photosensitive member as a reversed image; a roof type reflector device with an inner side reflection plane for reflecting an image of a photographic film onto a photosensitive member as a correct right/left side image; and a switch for setting one of the two reflector devices selectively in a printing optical path.

According to a preferred embodiment of this invention, a film front/back surface detector and a driver responsive to the film front/back surface detector are provided. The detector detects whether the photosensitive emulsion layer of a photographic film set on a film carrier is facing up or down. The driver uses the first reflector device if the photosensitive emulsion layer is facing down, and the second reflector if it is facing up.

According to the invention, the roof type reflector and flat plate type reflector are provided and are set selectively in the printing optical path in accordance with the setting condition of a photographic film front-/back surface. Accordingly, even if a photographic film is set on a film carrier while incorrectly turning it upside down, a correct reversal-free image can be printed on a photosensitive member without reloading the photographic film. Further, at a laboratory using the photographic printer of this invention, the loading condition of a photographic film on the film carrier may be determined beforehand with either its front or its back surface directed upward. Furthermore, at a laboratory using both the inventive photographic printer of this invention and a photographic printer shown in FIG. 10, the loading condition of a photographic film for the printer of this invention may be made the same as for the printer shown in FIG. 10, thus avoiding incorrect photographic film loading.

BRIEF DESCRIPTION OF THE DRAWINGS

The above and other objects and advantages of this invention will become apparent from the following detailed description when read in connection with the accompanying drawings, wherein.

DETAILED DESCRIPTION OF THE PREFERRED EMBODIMENTS

Figure 1:
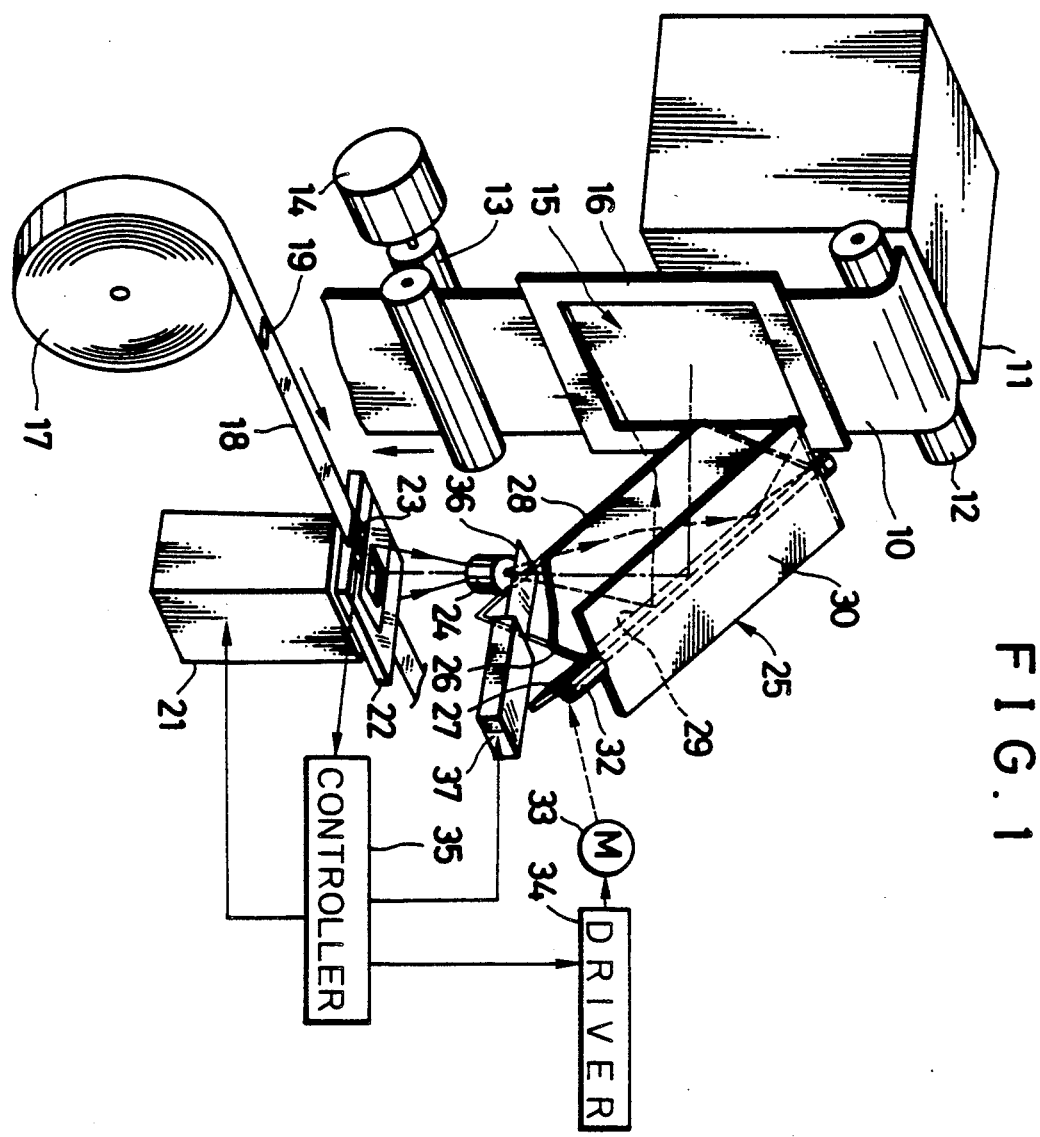
FIG. 1 is a perspective view showing the main part of a reflection type photographic printer according to an embodiment of this invention.

Referring to FIG. 1, a photosensitive member, e.g., a color paper 10, is wound in a roll and housed within a magazine 11. This color paper 10 is pulled out from the magazine 11 via a guide roller 12 upon rotation of a pair of feed rollers 13, and is fed in the vertical direction to an exposure stage 15 which is disposed parallel to the transport path of the color paper 10. The stage 15 has an easel mask 16 for masking the color paper 10. An image frame recorded in a photographic film, e.g., a 135 type negative film, is printed on a portion of the color paper 10 set at the exposure stage 15. The pair of feed rollers 13 are driven by a pulse motor 14.

A printing light from a light source 21 illuminates, from the back surface of the film, a frame of the negative film set at a film carrier 22. The light source 21, which is well known, includes a light source, a light quality adjuster using color filters for adjusting the light quality of a white light from the light source, and a diffusion box for uniformly diffusing a quality adjusted printing light.

Figure 9:
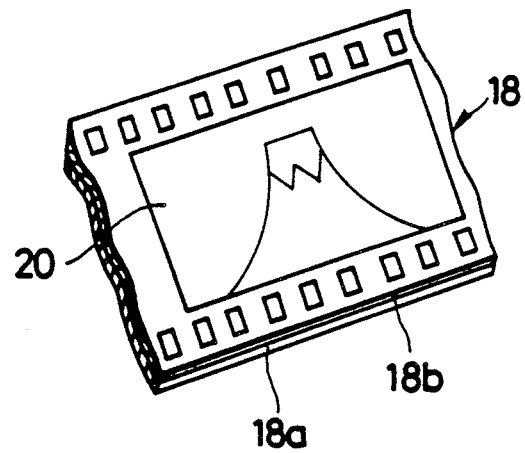
FIG. 9 is a perspective view showing a negative film.
Figure 10:
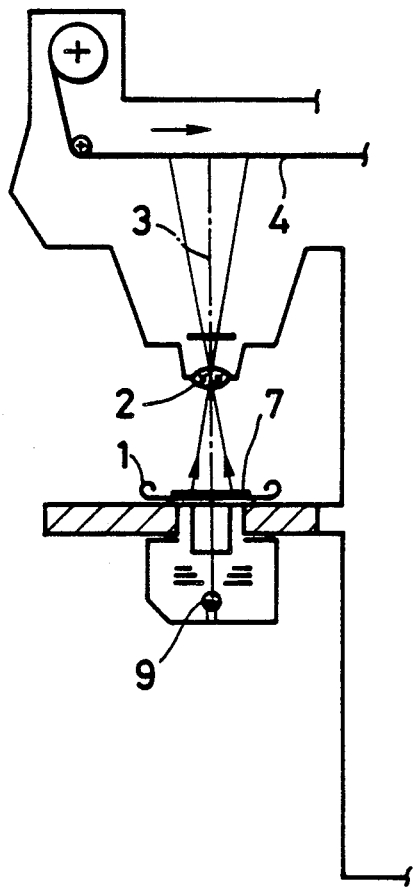
FIGS. 10 and 11 are schematic diagrams showing conventional photographic printers.
Figure 11:
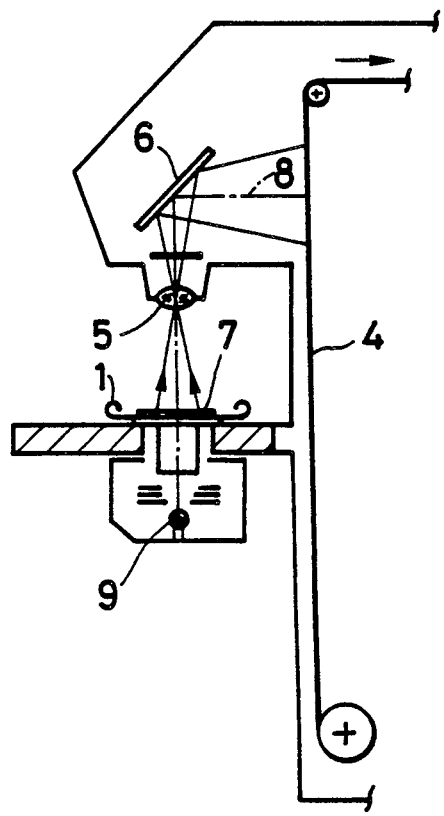

As shown in FIG. 9, a negative film 18 is made of a transparent plastic film base 18a having a photosensitive emulsion layer 18b coated thereon. An image frame is recorded in the photosensitive emulsion layer 18b. A number of negative films 18 are coupled together with splice tape 19 or the like, and are wound and formed into a long film roll 17. Since the long film roll 17 is made before photographic development, within the roll 17 there may be some negative films whose photosensitive emulsion layers 18b face the opposite way from those of the other negative films. Image frames 20 recorded in such negative films will result in a right/left reversed print image in the color paper 10. In consideration of this, a front/back surface detection sensor 23 is mounted on the film carrier 22 to detect the front/back surface of the loaded negative film 18.

The front/back surface detection sensor 23 is constructed of, e.g., a light projector and a light receptor, for detecting the amount of light emitted from the light projector and reflected from the surface of the negative film. Since the reflection factor of the negative film differs depending on whether the film is set with its photosensitive emulsion layer facing up or down, the front/back surface of the negative film 18 can be detected. A film front/back surface detection apparatus is described. e.g., in U.S. Pat. Nos. 4,645,351 and 4,779,988.

Figure 2:
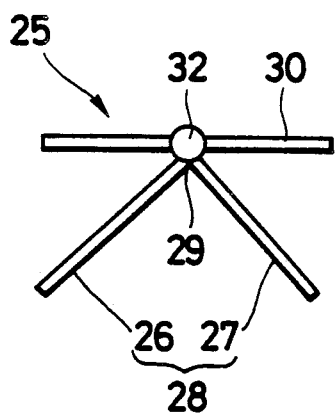
FIG. 2 is a plan view of the reflector shown in FIG. 1.

The image frame 20 in the negative film 18 is illuminated by the light source 21 and is projected onto the color paper 10 set on the exposure stage 15, via a printing lens 24, and reflector 25. As best shown in FIG. 2, the reflector 25 is constructed of a roof type (inverse V-character shaped) mirror 28 and a flat plate type mirror 30. The roof type mirror 28 has two inwardly-facing reflection planes 26 and 27. The flat mirror 30 is fixed to the back surface of the roof type mirror 28 along the roof edge 29. The reflector 25 is disposed with the roof edge 29 of the roof mirror 28 being slanted at a 45° angle relative to the printing optical axis of the printing lens 24 so that a printing light is reflected by 90° relative to the printing optical axis.

The reflector 25 is rotated by 180° by a switching device to position one of the roof mirror 28 or flat mirror 30 so as to face it toward the negative film 18. The switching device reverses the reflector 25 by rotating by 180° a rotary shaft 32 parallel with the roof edge 29 of the reflector 25. The switching device is constructed of a pulse motor 33, a driver 34 for driving the pulse motor 33, and a controller 35.

The controller 35 receives a front/back surface detection signal from the front/back surface detection sensor 23. If the negative film 18 is loaded upside down, i.e., with the photosensitive emulsion layer 18b facing toward the light source 21, the controller 35 causes the switching device to face the flat mirror 30 toward the negative film 18. Alternatively, if the negative film 18 is loaded with its front surface, i.e., the photosensitive emulsion layer 18b, facing upward, the controller 35 causes the switching device to face the roof type mirror 28 toward the negative film 18. In addition to the switching of the reflector 25, the controller 35 controls the feed rollers 13, the light source 21, and a shutter driving unit 37, as described later.

A shutter 36 is disposed between the reflector 25 and the printing lens 24. The shutter 36 is inserted into the printing optical path by the shutter driving unit 37 after a predetermined exposure time.

Next, the operation of this embodiment will be described. The negative film 18 loaded on the film carrier 22 is measured with the front/back surface detection sensor 23, the measured signal being sent to the controller 35. In response to this signal, the controller 35 decides whether the photosensitive emulsion layer 18b of the negative film 18 is facing up or down. If the negative film 18 is facing down, the motor 33 faces the flat mirror 30 of the reflector 25 toward the negative film 18. If the negative film 18 is facing up, the roof type mirror 28 of the reflector 25 is directed facing toward the negative film 18. The photosensitive emulsion layer 18b of the negative film 18 is facing up in FIG. 1, so that the roof type mirror 28 is set facing the negative film 18.

Next, the controller 35 causes the pair of feed rollers 13 to rotate by a predetermined amount in order to feed the color paper 10 by one frame and set it at the exposure stage 15. The image frame 20 in the negative film 18 is printed in the following manner on the color paper 10 in the exposure stage 15. First, the controller 35 causes a photometry unit (not shown) to measure a large area transmittance density of the image frame 20 of the negative film 18, for calculating an exposure control amount accordingly. The light quality adjuster of the light source 21 is driven in accordance with the calculation result to adjust the light quality of the light source 21. Thereafter, the shutter 36 is opened for a predetermined time to focus the image frame 20 in the negative film 18 onto the color paper 10 via the printing lens 24 and roof type mirror 25.

The printing light is reflected twice at the two reflection planes 26 and 27 of the roof type mirror 28 coupled at right angles, so that the correct right/left side image is focused onto the color paper 10. If the negative film 18 is loaded with its photosensitive layer 18b facing down, the motor 33 causes the reflector 25 to rotate by 180°. Thus, instead of the roof type mirror 28, the flat mirror 30 is set facing the negative film 18. The flat mirror 30 reverses the image on the right and left sides, so that even if the negative film 18 is set upside down on the film carrier 22, a correct right/left side image can be focused onto the color paper 10.

Figure 3:
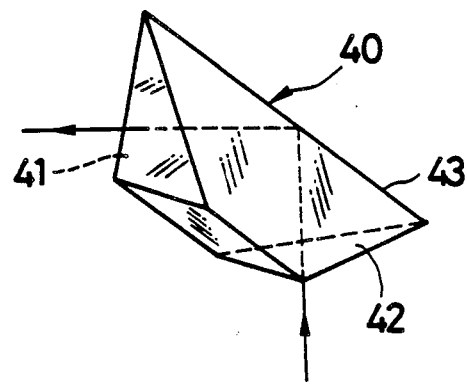
FIGS. 3 to 5 are perspective views showing other embodiments of the roof type reflection mirror.

As shown in FIG. 3, the roof type mirror may use a prism 40 which is formed by cutting opposite end surfaces of a triangular pole having a section in the form of a right angled isosceles triangle by an inclination angle of 45°. In this case, the reflection planes 41 and 42 are coupled at right angles at the roof edge 43.

Figure 4:
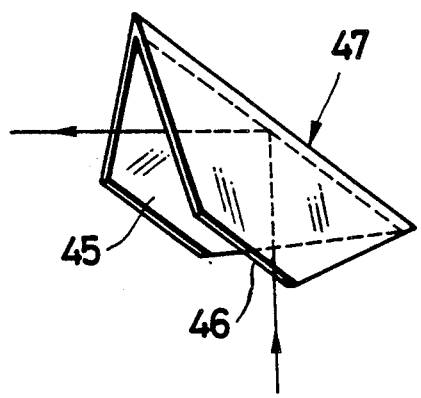
Figure 5:
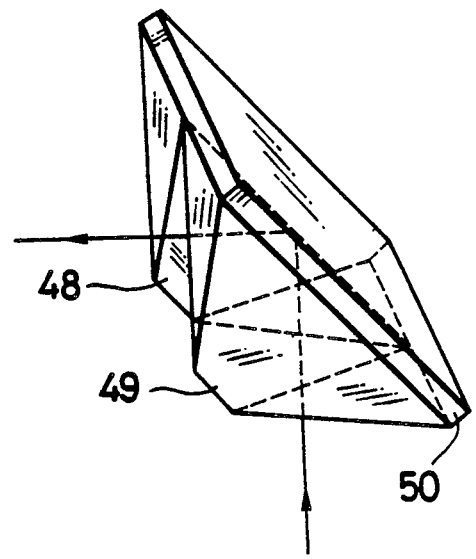

As shown in FIG. 4, a roof type mirror 47 may be used which is formed by two trapezoidal mirrors 45 and 46 coupled together at right angles on their bottom edges. Further, as shown in FIG. 5, a roof type mirror may be used which is formed by fixedly coupling side by side two prisms 48 and 49 to a support plate 50, the opposing planes of the prisms 48 and 49 being used as the reflection planes.

Figure 6:
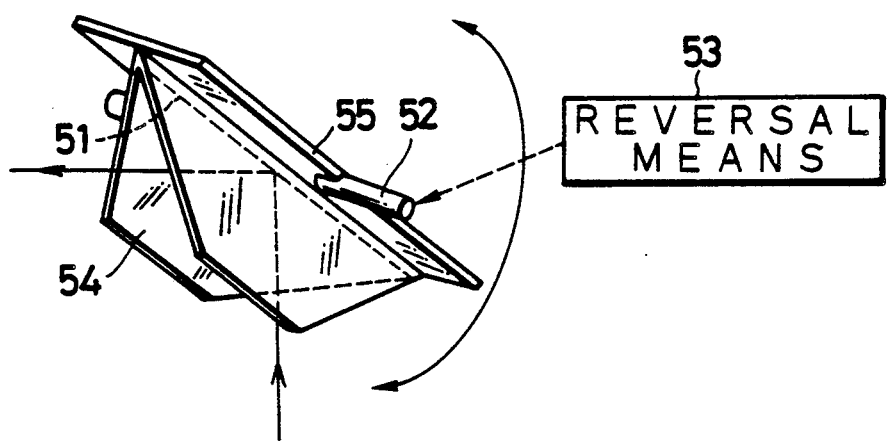
FIGS. 6 to 8 are perspective views showing other reflector embodiments.
Figure 7:
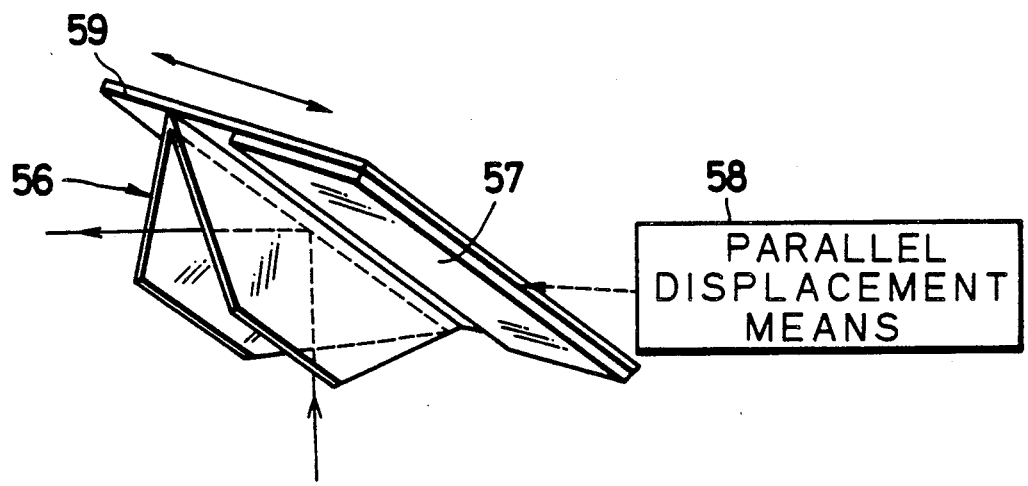

In the above embodiment, the roof type mirror 28 and flat mirror 30 are set selectively within the printing optical path by rotating the reflector 25 about the rotary shaft 32 parallel with the roof edge 29. However, the invention is not limited to such an arrangement for example, as shown in FIG. 6, a rotary shaft 52 may be mounted perpendicular to a roof edge 51, so that a roof type mirror 54 and flat mirror 55 can be inserted selectively into the printing optical path by having a reversal device 53 rotate the shaft by 180°. Further, as shown in FIG. 7, a roof type mirror 56 and flat mirror 57 may be fixed on a plate 59 so that the mirrors can be inserted selectively into the printing optical path by sliding the plate 59 by means of a parallel displacement device 58.

Figure 8:
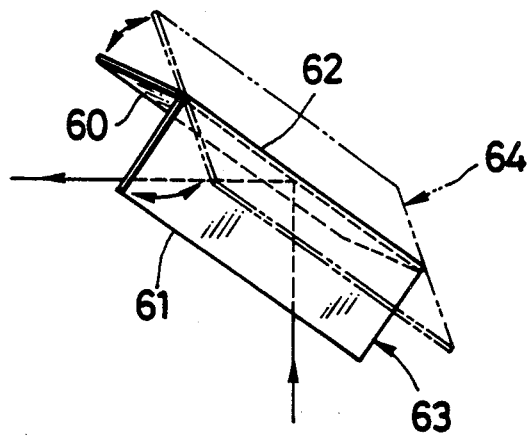

Still further, as shown in FIG. 8, two mirrors 60 and 61 hinged together with a hinge 62 may be opened by 90° or 180° to form either a roof type mirror 63 or a flat mirror 64.

In the above embodiment, although switching between the roof type mirror 28 and flat mirror 30 is performed automatically upon detection of a loading condition of the negative film 18, manual switching also is possible. The front/back surface information of the negative film 18 may be stored previously in a storage medium to cause subsequent switching between the roof type mirror and flat mirror in accordance with the stored data.

Although the invention has been described by way of preferred embodiments thereof, various modifications within the spirit of the invention will be apparent to those of working skill in this technological field. Therefore, unless otherwise noted, such modifications should be construed as included within the scope of the invention as defined by the appended claims.

What is claimed is:

1. A reflection type photographic printer wherein a photosensitive member is disposed perpendicular to a photographic film and an image in the photographic film positioned at a film set station is printed on the photosensitive member via an L-shaped printing optical path, said reflection type photographic printer comprising:

first reflection means, having a flat plate shape, for reflecting an image of said photographic film onto said photosensitive member as a reversed image;

second reflection means, having a roof type shape with opposing inner side reflection planes, for reflecting an image of said photographic film onto said photosensitive member as a correct right/left side image;

switching means for selectively setting one of said first and second reflection means in said printing optical path;

means for detecting whether a photosensitive emulsion layer of said photographic film is facing up or down, and generating a detection signal accordingly; and driving means, responsive to said detection signal, for driving said switching means, causing said first reflection means to be inserted into said printing optical path when said photosensitive emulsion layer faces down, and causing said second reflection means to be inserted into said printing optical path when said photosensitive emulsion layer faces up.

2. A reflection type photographic printer according to claim 1, wherein said first reflection means is disposed parallel to a roof edge of said roof of said second reflection means, said first and second reflection means being integrally formed.

3. A reflection type photographic printer according to claim 2, wherein said second reflection means comprises a prism formed by cutting opposite end surfaces of a triangular pole having a section in the form of a right angled isosceles triangle.

4. A reflection type photographic printer according to claim 2, wherein said second reflection means comprises two prisms, each having a triangular section, and disposed side by side, opposing planes of said two prisms forming a roof shape constituting a mirror surface of said second reflection means.

5. A reflection type photographic printer according to claim 2, further comprising means for rotating said first and second reflection means about an axis parallel to said roof edge.

6. A reflection type photographic printer according to claim 2, further comprising means for rotating said first and second reflection means about an axis perpendicular to said roof edge.

7. A reflection type photographic printer according to claim 1, further comprising a slidable support plate having one side surface on which said first and second reflection means are disposed side by side.

8. A reflection type photographic printer according to claim 1, wherein said first and second reflection means together comprise two flat plate reflection means rotatable about a common axis, and means for positioning said two flat plate reflection means with respect to each other, said first reflection means being formed by positioning said two flat plate reflection means on a single flat plane, and said second reflection means being formed by positioning said two flat plate reflection means at an angle, in a roof shape.

* * * * *